United States Patent [19]
Jansen

[11] Patent Number: 4,828,292
[45] Date of Patent: May 9, 1989

[54] ADJUSTABLE FLUID SWIVEL
[75] Inventor: Martin Jansen, Calabasas, Calif.
[73] Assignee: Amtel, Inc., Providence, R.I.
[21] Appl. No.: 139,911
[22] Filed: Dec. 31, 1987
[51] Int. Cl.⁴ .............................................. F16L 39/00
[52] U.S. Cl. ..................................... 285/93; 285/136;
285/272; 384/519; 384/626
[58] Field of Search ...................... 285/136, 93, 133.1,
285/131, 272; 384/519, 626

[56] References Cited
U.S. PATENT DOCUMENTS

| 1,556,940 | 10/1925 | Leis | 384/626 |
| 4,647,076 | 3/1987 | Pollack et al. | 285/272 |
| 4,662,657 | 5/1987 | Harvey et al. | 285/136 |

FOREIGN PATENT DOCUMENTS

| 1550 | 10/1877 | Fed. Rep. of Germany | 285/93 |
| 2239314 | 2/1974 | Fed. Rep. of Germany | 285/93 |

Primary Examiner—Randolph A. Reese
Assistant Examiner—Anthony Knight
Attorney, Agent, or Firm—Freilich, Hornbaker, Rosen & Fernandez

[57] ABSTRACT

A fluid swivel is described, which enable the measurement and the adjustment of separation of seal surfaces. The fluid swivel includes inner and outer walls that are rotatably coupled about an axis and that form an annular chamber and a pair of gaps extending from the chamber. A hollow region is formed along each gap for holding a face seal, and the gap forms an extrusion gap portion extending radially from each hollow region. The inner and outer walls form axially-spaced wall surfaces adjacent to the hollow region, and one of the walls has a gage-passing passage leading from the outside of the wall to the space between the wall surfaces to pass a gage for measuring the separation gap between the wall surfaces. One of the walls includes a plurality of parts and also includes shims between the parts for enabling slight adjustment of the spacing between the seal surfaces, depending on the thickness of the shims.

10 Claims, 3 Drawing Sheets

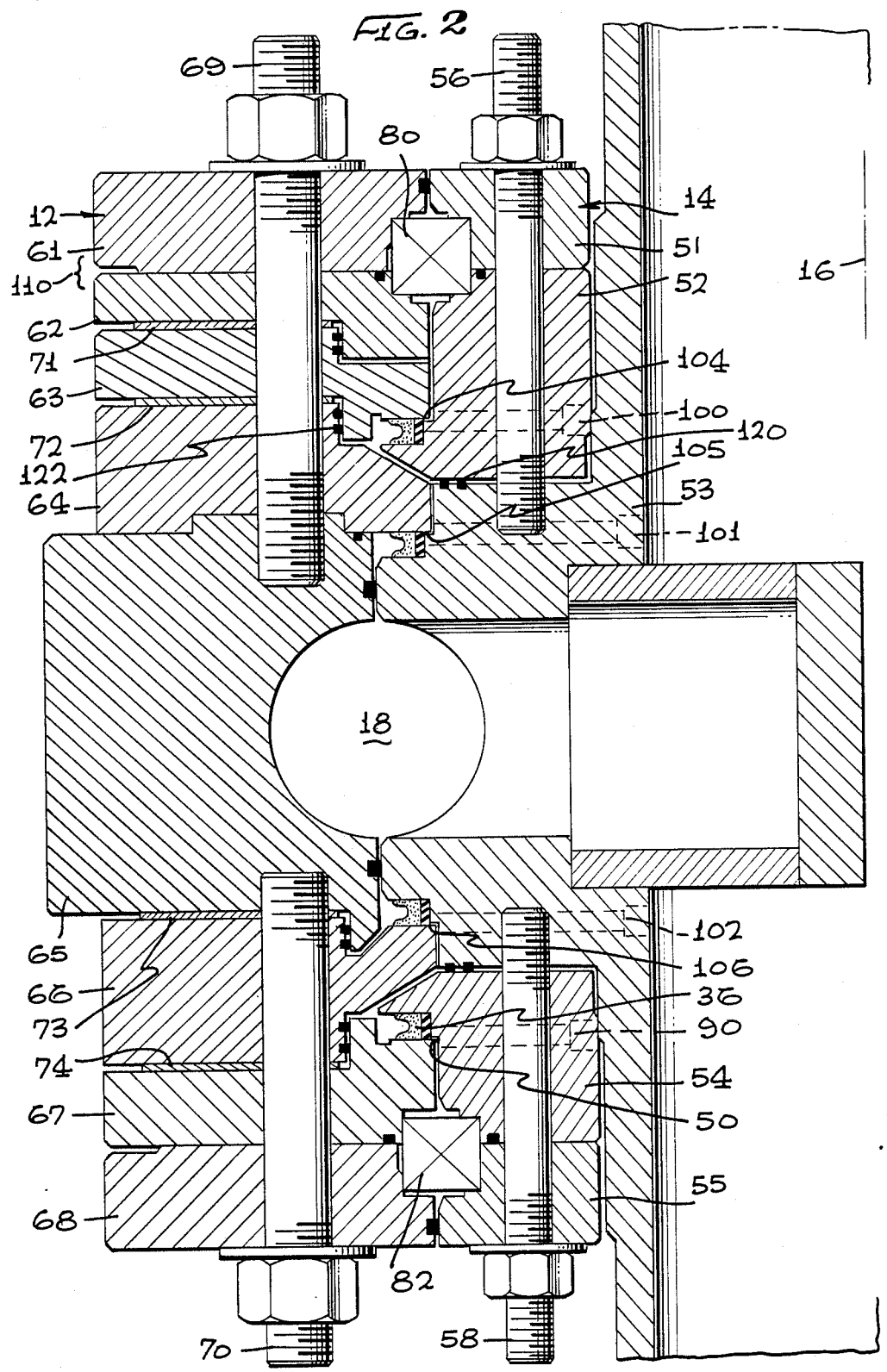

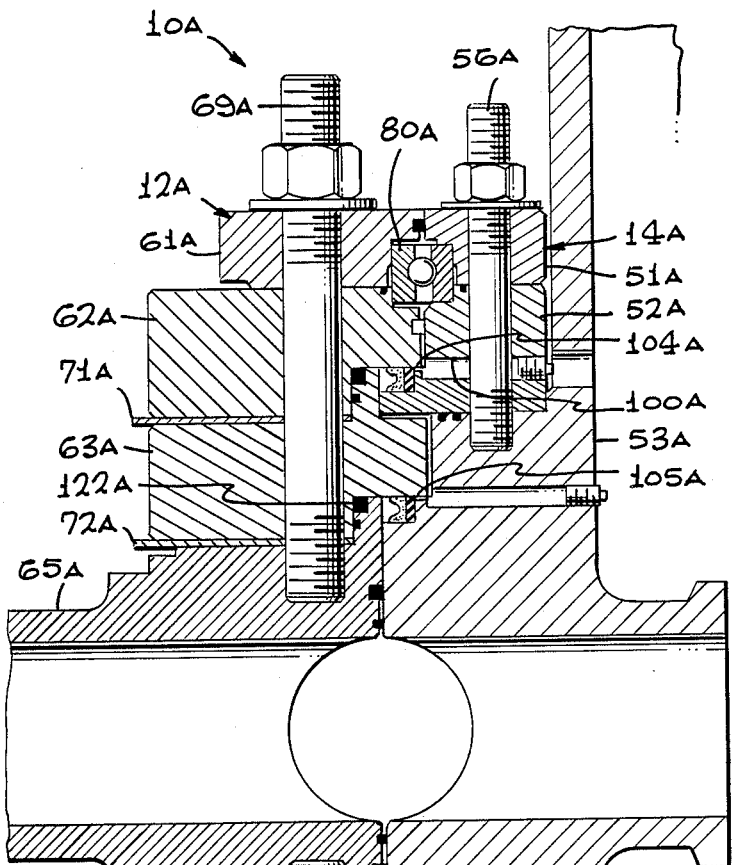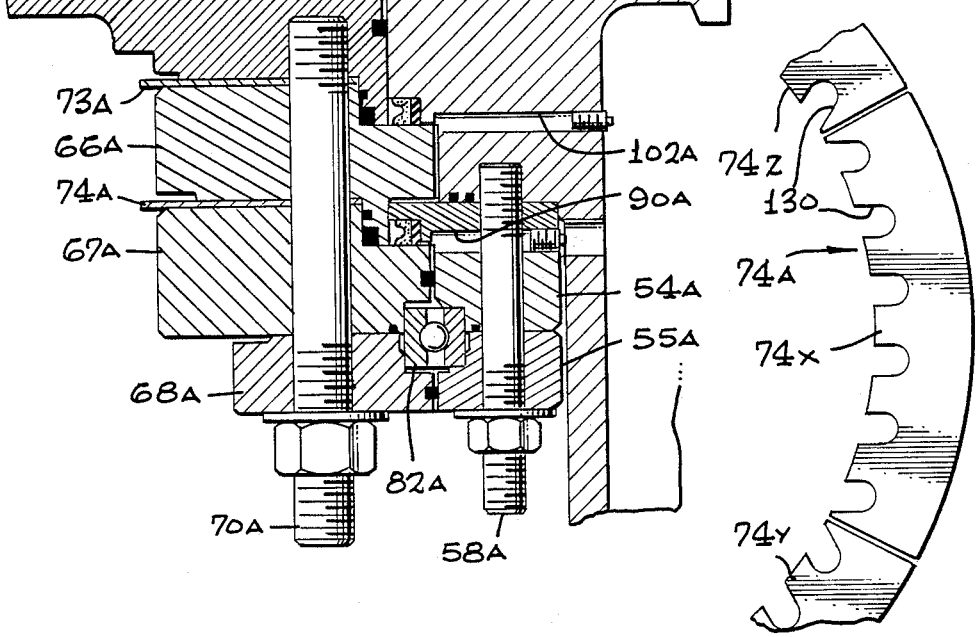

ADJUSTABLE FLUID SWIVEL

BACKGROUND OF THE INVENTION

Fluid swivels are commonly used in offshore installations to transfer fluids such as gas and oil between an underwater pipeline or well and a tanker. A typical fluid swivel of this type includes a ring-shaped outer wall that rotates about a relatively fixed inner wall, the walls forming an annular chamber between them through which fluid passes. There are gaps between the walls leading in opposite directions from the chamber, and these gaps or gap passages must be sealed.

Prior art swivels have generally used radial seals to seal the gap between the inner and outer walls, each seal pressing radially inwardly against the inner wall and radially outwardly against the outer wall. The life of the seal depends upon changes in the thickness of the extrusion gap portion which lies on a side of the seal furthest from the annular chamber. The thickness of this extrusion gap portion greatly increases when high pressure fluid is applied, and the increased thickness decreases the lifetime of the seal. The use of face seals, or axial seals, which press in opposite axial directions against seal surfaces on the inner and outer walls, and with the extrusion gap portion extending radially, can greatly increase the lifetime of the seals, because the thickness of the extrusion gap portion does not increase greatly when high pressure fluid is applied. This is especially useful for fluid swivels that may operate at high pressures such as 2000 psi, and which have a large diameter such as an annular chamber diameter of at least about 4 feet.

While the use of axial or face seals reduces changes in the thickness of the extrusion gap portion, it can lead to problems in precisely controlling the thickness of the extrusion gap portion. The inner and outer walls of the swivel are formed by several parts that are stacked on one another. The desired thickness of each extrusion gap portion may be perhaps 10 mils (one mil equals one thousandth inch), and care must be taken that the sum of the tolerances of the stacked parts does not greatly decrease the gap thickness (which can lead to the walls rubbing on each other) or result in an excessively large gap thickness, (leading to short seal life). It is possible to hold the various parts to extremely small tolerances, but this results in much greater expense in manufacture. A fluid swivel with face seals along the gap passages, which enabled the maintenance of close tolerances in the extrusion gap passages, while enabling the fluid swivel to be constructed at moderate cost, would be of considerable value.

SUMMARY OF THE INVENTION

In accordance with one embodiment of the present invention, a fluid swivel is provided, which facilitates close control of the axial spacing of portions of the inner and outer walls. One of the walls can include an inspection passage leading from the outside of the fluid swivel to the extrusion gap portion, to enable gages to be applied to measure the actual gap thickness. One of the walls also can be constructed with shims, to enable fine adjustment of the axial spacing of the walls at the extrusion gap portions.

The novel features of the invention are set forth with particularity in the appended claims. The invention will be best understood from the following description when read in conjunction with the accompanying drawings.

BRIEF DESCRIPTION OF THE DRAWINGS

FIG. 4 is a view of a portion of the fluid swivel of FIG. 2.

FIG. 5 is an illustration of another type of shim construction.

FIG. 6 is an illustration of another fluid swivel.

DESCRIPTION OF THE PREFERRED EMBODIMENT

Figure 1:
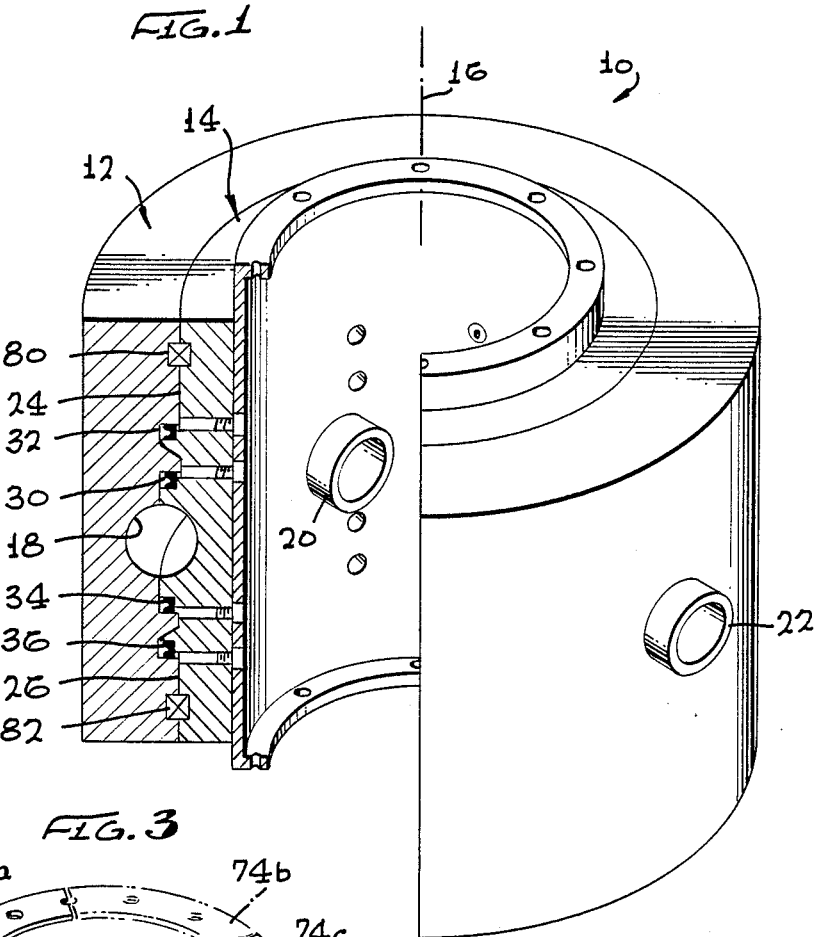
FIG. 1 is a simplified perspective and sectional view of a fluid swivel constructed in accordance with the present invention.

FIG. 1 illustrates a fluid swivel 10 which includes inner and outer walls 14, 12 that are rotatably coupled about an axis 16. The walls form an annular chamber 18 between them, which is coupled to inlet and outlet pipes 20, 22. The walls form a pair of gaps or gap passages 24, 26 that extend from opposite sides of the chamber. Primary and secondary seals 30, 32 are provided along the upper gap 24, and primary and secondary seals 34, 36 are provided along the lower gap, to seal the gaps against the loss of fluid to the environment. The seals 30-36 continue to seal despite rotation of the walls relative to each other.

As shown in FIG. 4, each seal such as 36 lies in a hollow region 40 along a gap 26, and seals against axially-spaced (spaced parallel to the axis 16) seal surfaces 42, 44 lying respectively on the inner and outer walls 14, 12. Each seal has a high pressure side 46 where it may be subjected to a high pressure (such as a 2000 psi pressure in the annular chamber) and a low pressure side 48 where it may be subjected to a much lower pressure (e.g. ambient atmospheric pressure or perhaps a 1000 psi reduction pressure). The gap includes an extrusion gap portion 50 lying on a side of the seal furthest from the annular chamber, into which the seal tends to be extruded by the high pressure difference across it. The extrusion gap portion 50 preferably extends in a primarily radial direction R so the thickness T of the extrusion gap portion does not change greatly (due to hoop stress) between the time when zero pressure and maximum pressure is applied to the fluid swivel.

Figure 2:
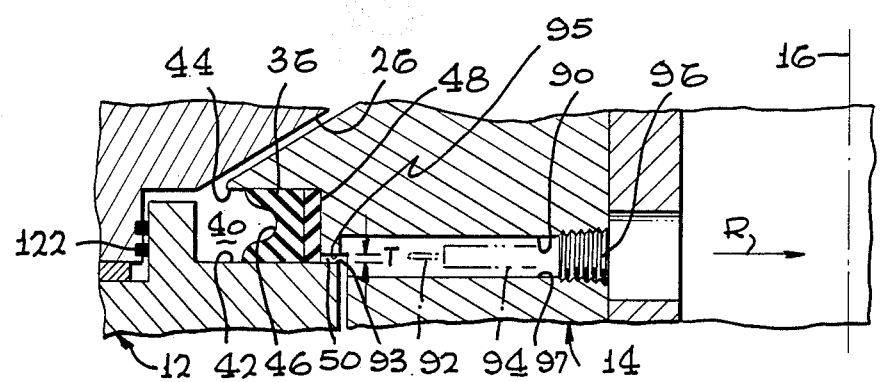
FIG. 2 is a more detailed sectional view of the fluid swivel of FIG. 1.

As shown in FIG. 2, each of the walls 12, 14 of the fluid swivel is constructed from several individual steel elements stacked on one another. For example, the inner wall 14 is shown constructed of five elements 51-55 that are arranged in a stack and held together by bolts 56, 58. The outer wall 12 is formed of eight main elements 61-68 (and four shims 71-74 to be described below) arranged in another stack and held together by bolts 69, 70. An upper bearing 80, which is both a radial and axial bearing, fixes the relative axial positions (i.e. along a line parallel to the axis 16) of the elements 52, 62 of the outer and inner walls. A lower bearing 82 is only a radial bearing, and does not affect the relative axial positions of elements.

The thickness T (FIG. 4) of the extrusion gap portion 50, which has a significant effect on the life of the seal 36, may be nominally set to perhaps 10 mils (1 mil equals 1 thousandth inch). The actual thickness of the gap 50 depends upon the accumulations of tolerances in three elements 52-54 of the outer wall and the accumulation of tolerances in six elements 62-67 in the inner wall. Each of these elements may have a thickness on the order of one half foot and may have a surface of perhaps five feet diameter that must lie facewise against an adjacent element. It is costly to manufacture such parts so their thickness and the flatness of their faces are all held to a tolerance of two mils; however, even such a tight tolerance can lead to an extrusion gap that is nominally 10 mil thick resulting in an interference fit of 8 mil in a worst case situation (where the outer wall elements 52-54 are all 2 mil oversize and the inner wall elements 62-67 are all 2 mil undersize). Since the gaps lie deep within the fluid swivel, it has previously been difficult to determine the actual thickness of different portions of the gaps.

In accordance with one aspect of the present invention, an inspection or gage-passing 90 (FIG. 4) is provided in one of the walls 14, that leads from the outside of the wall to the extrusion gap portion 50. A thickness or feeler gage 92 held at the end of a rod 94 can be inserted through the passage 90 and inserted into the extrusion gap portion 50 to determine the thickness of the gap portion 50. It would also be possible to measure the separation of other surfaces on the two walls such as 95 and 97 which indicate the thickness of the extrusion gap passage. A plug 96 preferably seals the passage 90 when measurement are not being taken. However, it is possible to measure the thickness T of the extrusion gap portion 50 even when the fluid swivel contains (in the annular chamber 18) fluid under high pressure, since the gap passage 50 is on the low pressure side of the seal (assuming the low pressure side is at atmospheric pressure). A separate gap passage 100, 101, 102, and 90 (FIG. 2) is provided for each extrusion gap portion 104, 105, 106, and 50. Thus, as the elements of the fluid swivel are assembled, or after they are assembled, it is possible to measure the extrusion gap portion at each seal, to determine whether it is within an acceptable range. Since the extrusion gap passage walls 93, 95 are adjacent and integral with the seal surfaces 42, 44, the gage measurement also indicates the thickness of the hollow region 40.

If an extrusion gap portion thickness is not within a desired range, it would be possible to grind or otherwise machine one of the elements to change the thickness of the extrusion portion. However, it is difficult to perform the required machining because each of the elements may have a larger size than can be accomodated by most available machinery. For example, a fluid swivel whose annular chamber has a 4 foot diameter, has elements of about that diameter. It is difficult to find a precision grinding machine that can handle such a large element, especially where the grinding is to occur "in the field," that is, near the place where the fluid swivel is to be installed. Also, if the part is damaged during the machining, as where excessive material is removed at one spot, this would result in considerable delay and additional expense in constructing a substitute element.

In accordance with another aspect of the invention, shims 71-74 (FIG. 2) are provided between certain elements of one of the walls 12 of the fluid swivel. The relative axial positions of the inner and outer walls are controlled by the upper bearing 80 which is an axial bearing as well as a radial bearing. The elements 61, 62 of the outer wall form a first part 110 mounted to the upper bearing. A second part formed by element 63 forms one surface of the extrusion gap portion 104, and the thickness of the portion 104 depends upon the thickness of the shim 71 separating the first and second parts 110, 63. Thus, by proper selection of the shim thickness, the thickness of the extrusion gap portion 104 is closely controlled. The thickness of the shims 72, 73, and 74 similarly control the thicknesses of the extrusion gap portions 105, 106, and 107.

Figure 3:
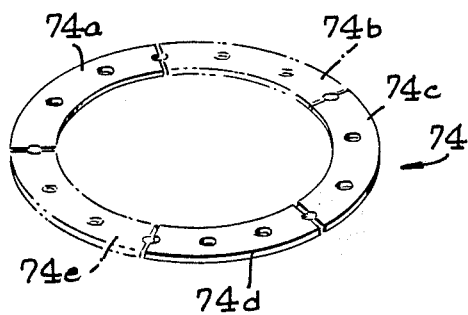
FIG. 3 is a perspective view of a shim of the fluid swivel of FIG. 2.

In a 4 foot diameter (of the annular chamber) fluid swivel, most of the elements have a thickness of several inches. Applicant starts with shims that are normally 0.1 inch thick, and that are oversized. As shown in FIG. 3, each of the shims such as 74 is formed in a plurality of segments 74a–74e. The segments enable grinding of the shim by grinding machines that can handle work pieces of only moderate size. For a four feet diameter swivel, each of the five segments 74a–74e has a length of only about 2.3 feet, which is about 58% of the swivel diameter. The use of at least three segments enables each segment to have a length less than 3.5 feet, or less than 90% of the four feet diameter fluid swivel. The grinding of the shims proceeds until a desired extrusion gap thickness such as 10 mils is achieved at each of the four extrusion gap portions. This is achieved by measuring each extrusion gap by feeler gage 92 to determine its oversize relative to the desired gap thickness of 10 mils, and grinding the corresponding shims to reduce their thickness by the oversize. This process starts at the top shim 71 and proceeds downward to the lowermost shim 74. The shim segments can be individually removed and replaced without disassembling the entire stacked element, by removing some of the bolts such as 70 and loosening other bolts 70. Since the shims are uniformly thick and formed from simple metal plates, they are of low cost and easily handled for machining.

As shown in FIG. 2, adjacent non-rotating elements such as 52, 53 are sealed as by O-rings shown at 120, to avoid leakage of fluid from the gap passage into the environment. Those elements of the outer wall such as 63 and 64 that are spaced apart by a shim 72, could each be sealed by O-rings to the shim, except for the fact that the shim is segmented. Applicant seals the elements such as 63 and 64 directly to each other by a pair of static non rotating O-rings 122, by making a radial seal at the O-rings 122. As the thickness of the shim 72 varies, the axial separation of the elements 63, 64 also varies; however, the radial spacing of the elements at the O-rings 122 does not vary and sealing can be economically made there. Similar radial seals are placed between other pairs of adjacent elements that are separated by segmented shims.

FIG. 5 illustrates a shim 74A of another construction, wherein the shim is divided into six identical shim sections 74X, 74Y, 74Z that facilitate installation and removal of the segments. Each segment includes a plurality of parallel slots 130 extending from the radially inner side of the shim. This enables installation and removal of shim segments while the bolts holding the wall elements together are still loose. The use of at least three shim segments, each extending by less than a half circle, enables the segments to hold the parts together with one shim segment removed. Wedges can be used to maintain a gap while the shims are installed or removed.

FIG. 6 illustrates a fluid swivel 10A largely similar to that of FIG. 2, with similar parts bearing the same number but with an "A" after the number. It can be seen that the shims 71A–74A project radially outward from adjacent wall elements, which facilitates installation and removal of the shim segments. It may be noted that the uppermost extrusion gap portion 104A cannot be adjusted by adjusting shim thickness. However, there are a minimum number of parts between the axial-radial bearing 80A and the uppermost extrusion gap portion, so there is minimum accumulation of tolerances.

Thus, the invention provides a fluid swivel with extrusion gap portions that can be measured in the assembled fluid swivel, and which can be easily adjusted in thickness. One of the walls of the swivel has an inspection passage extending to the outside, for receiving a gage that measures the thickness of the extrusion gap portion. The thickness of each extrusion gap portion can be varied by including shims in one of the fluid swivel walls between elements of the wall, to facilitate small changes in the spacing. Each shim is preferably composed of a plurality of segments, to facilitate machining of the shims to slightly reduce their thickness, and to facilitate installation of the shims. Adjacent elements on one of the walls that are separated by a shim, can be sealed to one another by radial seals, to assure sealing despite separation of the walls by a segmented shim.

Although particular embodiments of the invention have been described and illustrated herein, it is recognized that modifications and variations may readily occur to those skilled in the art and consequently it is intended to cover such modifications and equivalents.

What is claimed is:

1. In a fluid swivel which includes ring-like inner and outer walls that are rotatably coupled about an axis and that form a chamber between them and a gap between them that extends from the chamber to the environment, said gap having a hollow region with axially-spaced seal surfaces respectively on said inner and outer walls and containing a face seal lying in said hollow region and sealing against said axially-spaced walls, and an extrusion gap portion that is narrower than said hollow region extending radially from said hollow region, the improvement wherein:

said extrusion gap portion includes a pair of substantially axially-spaced wall surfaces, one on said inner wall and one on said outer wall, and one of said walls has an inspection passage leading from the outside of the wall to the space between said wall surfaces for passing a thickness gage from the outside to the space between said wall surfaces, said passage having a thickness greater than said space between said wall surface to readily pass a thickness gauge with a portion that is about as thick as said space between wall surfaces.

2. The improvement described in claim 1 including:
a first bearing rotatably coupling said inner and outer walls;
at least a first of said walls includes first and second parts, said first part mounted to said first bearing, said second part forming one of said seal surfaces, said first wall also including a shim between said first and second parts and means for fastening said parts together with said shim between them;
said first and second parts have adjacent but radially-spaced surfaces, and including a radial seal sealing said radially-spaced surfaces to one another.

3. In a fluid swivel which includes ring-like inner and outer walls that form an annular chamber between them and a gap between them that extends from the chamber, an axial bearing that rotatably couples said walls about an axis, said gap having a hollow region with axially-spaced seal surfaces respectively on said inner and outer walls and a face seal lying in said hollow region and sealing against said axially-spaced seal surfaces, and wherein the space between said seal surfaces must be maintained within predetermined limits, the improvement wherein:

a first of said walls includes first and second axially spaced parts, said first part connected to said bearing, said second part forming the seal surface on said first wall, and including a replaceable shim between said first and second parts, said shim being of a thickness which establishes said seal surfaces at a spacing within said predetermined limits;
said first and second walls have spaced wall surfaces integral with the adjacent to said seal surfaces;
said second wall includes a gauge-receiving passage leading to the space between said spaced wall surfaces, for receiving a gauge that measures the separation of said spaced wall surfaces, whereby to enable a determination of the shim thickness that is required.

4. The improvement described in claim 3 wherein:
said gap forms a radially-extending extrusion gap portion extending from said hollow region and with surfaces spaced by less than half the spacing of said seal surfaces, said extrusion gap portion forming said spaced wall surfaces.

5. In a fluid swivel which includes ring-like inner and outer walls that are rotatably coupled about an axis and that form a chamber between them, and a gap between them that extends from the chamber to the environment, said gap having at least two hollow regions with axially-spaced seal surfaces respectively on said inner and outer walls and a face seal lying in each hollow region and sealing against said axially-spaced seal surfaces, the improvement wherein:

a first of said walls includes first and second axially spaced parts, said first part forming a seal surface at a first of said hollow regions and said second part forming a seal surface at a second of said hollow regions, and the second of said walls forms seal surfaces at said first and second hollow regions that lie axially opposite the seal surface formed by said parts of said first wall thereat;
said first and second parts of said first wall and said second wall each have wall surfaces adjacent to said seal surface at said second hollow region, and one of said walls has a gage-receiving passage leading to said wall surfaces, to thereby enable a measurement of the axial separation of the seal surfaces at said hollow regions; and
means for finely adjusting the separation of said parts of said first wall, to thereby adjust the separation of the seal surfaces at said second hollow region.

6. In a fluid swivel which includes ring-like inner and outer walls that are rotatably coupled about an axis and that form a chamber between them and a gap between them that extends from the chamber to the environment, said gap having a region with closely-spaced surfaces respectively on said inner and outer walls, the improvement wherein:

one of said walls has an inspection passage leading from the outside of the wall to the space between said closely-spaced wall surfaces in said region, said passage including at least a portion that extends in a substantially straight line from the outside of the wall to said closely-spaced wall surfaces to pass a thickness gauge device from the outside to the space between said wall surfaces.

7. The improvement described in claim 6 wherein:
said passage has a thickness greater than the space between said wall surfaces.

8. In a fluid swivel which includes inner and outer walls that form an annular chamber between them and a gap between them that extends from the chamber, an axial bearing that rotatably couples said walls about an axis, said gap having a hollow region with axially-spaced seal surfaces respectively on said inner and outer walls and a face seal lying in said hollow region and sealing against said axially-spaced seal surfaces, the improvement wherein:
   a first of said walls includes first and second axially spaced parts, said first part connected to said bearing, said second part forming the seal surface on said first wall, and including a shim between said first and second parts;
   said first and second parts of said first wall have adjacent but radially-spaced surfaces, and including a radial seal sealing said surfaces to each other, whereby to seal said first and second parts against the leakage of fluid despite a variable axial separation between them.

9. In a fluid swivel which includes ring-like inner and outer walls that form an annular chamber between them and a gap between them that extends from the chamber, a bearing that rotatably couples said walls about an axis, said gap having a hollow region with axially-spaced seal surfaces respectively on said inner and outer walls and a face seal lying in said hollow region and sealing against said axially-spaced seal surfaces, the improvement wherein:
   a first of said walls includes first and second axially spaced parts, said first part connected to said bearing, said second part forming the seal surface on said first wall, and including a shim between said first and second parts, said shim comprises a plurality of shim segments;
   a plurality of elongated fasteners that project through said parts and said shim segments to hold them together;
   said plurality of shim segments includes at least three segments that each extend by less than a half-cricle about said axis, and each of said shim segments includes a plurality of parallel slots for receiving said fasteners by radial movement of the shim segment, whereby to enable replacement of shim segments without disassembling the fluid swivel.

10. The improvement described in claim 9 wherein:
said plurality of shim segments includes at least five segments.

* * * * *